J. E. ABLER.
METHOD OF MAKING HOLLOW RUBBER TOYS.
APPLICATION FILED AUG. 24, 1917.

1,255,496.

Patented Feb. 5, 1918.

INVENTOR
John E. Abler

UNITED STATES PATENT OFFICE.

JOHN EDWARD ABLER, OF GUELPH, ONTARIO, CANADA.

METHOD OF MAKING HOLLOW RUBBER TOYS.

1,255,496.  Specification of Letters Patent.  Patented Feb. 5, 1918.

Application filed August 24, 1917. Serial No. 188,027.

*To all whom it may concern:*

Be it known that I, JOHN EDWARD ABLER, of the city of Guelph, in the county of Wellington, in the Province of Ontario, Canada, have invented certain new and useful Improvements in Methods of Making Hollow Rubber Toys, of which the following is the specification.

My invention relates to improvements in hollow rubber animal toys, and the object of the invention is to devise a simple, quick and efficient method of forming a toy of this description.

My method consists in forming on a suitable form by the rubber dipping process the outer rubber wall of the particular animal by dipping several times, then vulcanizing the wall thus produced on the form, slitting the rubber wall or covering at a suitable point and withdrawing it from the form, and then closing the slit or aperture, so as to connect the parts together by a suitable reinforcement, and a covering of rubber suitably cemented or secured in place to hide the slit as hereinafter more particularly explained.

In the drawings like letters of reference indicate corresponding parts in each figure.

1 is a form, which may be of any suitable material. 2 is a coating or wall of rubber, which is formed by means of the ordinary rubber dipping process.

It will, of course, be understood that in order to give the requisite thickness to the wall 2 it is necessary to dip the form 1 several times, each time after the rubber has dried sufficiently. This is, however, commonly known in the art and need not further be referred to.

In the present instance the form 1 is that of a bear. In this particular instance I first vulcanize the wall upon the form and this has the result of separating the now formed rubber wall from the form.

Figure 1:
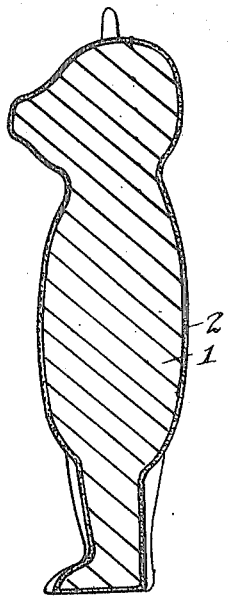
Figure 1, shows a sectional view of the form showing the wall of a hollow toy as formed.
Figure 2:
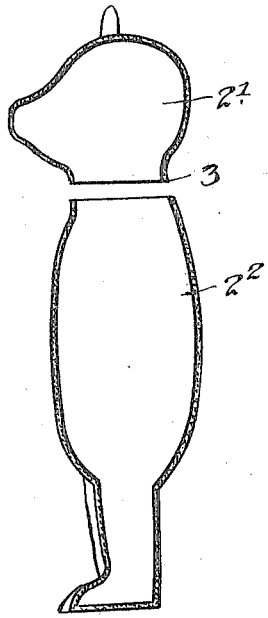
Fig. 2, is a sectional view showing the two parts separated.
Figure 3:
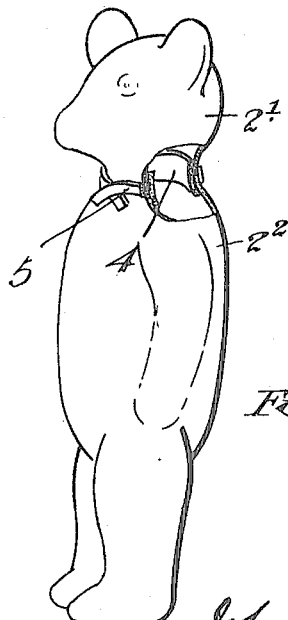
Fig. 3, is a perspective view showing a completed animal, a portion being broken away to show the means of connecting the parts.

After vulcanizing I cut a slit 3 around the neck, which is the preferable place. By slitting the wall I may draw the upper part 2' off the head of the form and the lower part 2² from the neck downwardly off the form. I then fasten the two severed parts together by a section of rubber tube or other suitable reinforcement 4, which is suitably cemented, within the edges of the parts 2' and 2². I then preferably place a neck band 5 over the slit in the manner shown in Fig. 3.

In carrying out my method of forming the animal I may if I desire to give a rough or woolly appearance to the outside utilize what is technically known as rubber dust during the period when I am forming the animal by the dipping process, this rubber dust being mixed with the liquid rubber.

By the method I have described I am enabled to produce hollow rubber animal toys at a cost very much lower than by the method now commonly in use.

What I claim as my invention is.

The method herein described of making hollow rubber animal toys consisting in forming the wall of the toy by dipping and then dividing the toy into two portions, then inserting and cementing an internal reinforcing band within the hollow toy to connect the divided portions of the toy together and then cementing a covering strip over the line of division on the exterior.

JOHN EDWARD ABLER.

Witnesses:
  JAMES NOSS,
  W. B. SUTTON.